US009424092B2

(12) United States Patent
Singh et al.

(10) Patent No.: US 9,424,092 B2
(45) Date of Patent: Aug. 23, 2016

(54) HETEROGENEOUS THREAD SCHEDULING

(71) Applicant: Microsoft Technology Licensing, LLC, Redmond, WA (US)

(72) Inventors: Neeraj Kumar Singh, Seattle, WA (US); Tristan A. Brown, Bellevue, WA (US); Jeremiah S. Samli, Kirkland, WA (US); Jason S. Wohlgemuth, Seattle, WA (US); Youssef Maged Barakat, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/498,599

(22) Filed: Sep. 26, 2014

(65) Prior Publication Data

US 2016/0092274 A1    Mar. 31, 2016

(51) Int. Cl.
*G06F 9/45* (2006.01)
*G06F 9/50* (2006.01)
*G06F 9/48* (2006.01)

(52) U.S. Cl.
CPC ............ *G06F 9/5027* (2013.01); *G06F 9/4893* (2013.01); *G06F 9/5094* (2013.01)

(58) Field of Classification Search
None
See application file for complete search history.

(56) References Cited

U.S. PATENT DOCUMENTS

| 7,093,147 | B2 | 8/2006 | Farkas et al. |
| 8,010,822 | B2 | 8/2011 | Marshall et al. |
| 8,490,103 | B1 | 7/2013 | Belady |
| 8,615,647 | B2 | 12/2013 | Hum et al. |
| 8,689,021 | B1 | 4/2014 | Bai et al. |
| 2012/0284729 | A1 | 11/2012 | Sharda et al. |
| 2012/0317568 | A1 | 12/2012 | Aasheim |
| 2013/0132972 | A1 | 5/2013 | Sur et al. |
| 2013/0191817 | A1* | 7/2013 | Vorbach ................ G06F 8/4441 717/150 |
| 2013/0318379 | A1 | 11/2013 | Seshadri et al. |
| 2014/0026146 | A1 | 1/2014 | Jahagirdar et al. |

(Continued)

FOREIGN PATENT DOCUMENTS

WO    WO-2009120427    10/2009

OTHER PUBLICATIONS

"International Search Report and Written Opinion", Application No. PCT/US2015/051566, Jan. 4, 2016, 12 pages.
Bower, et al., "The Impact of Dynamically Heterogeneous Multicore Processors on Thread Scheduling", In Proceedings: IEEE Micro, vol. 28, Issue 3, May 2008, 9 pages.

(Continued)

*Primary Examiner* — Chuck Kendall
(74) *Attorney, Agent, or Firm* — John Jardine; Judy Yee; Micky Minhas

(57) ABSTRACT

Heterogeneous thread scheduling techniques are described in which a processing workload is distributed to heterogeneous processing cores of a processing system. The heterogeneous thread scheduling may be implemented based upon a combination of periodic assessments of system-wide power management considerations used to control states of the processing cores and higher frequency thread-by-thread placement decisions that are made in accordance with thread specific policies. In one or more implementations, a system workload context is periodically analyzed for a processing system having heterogeneous cores including power efficient cores and performance oriented cores. Based on the periodic analysis, cores states are set for some of the heterogeneous cores to control activation of the power efficient cores and performance oriented cores for thread scheduling. Then, individual threads are scheduled in dependence upon the core states to allocate the individual threads between active cores of the heterogeneous cores on a per-thread basis.

20 Claims, 6 Drawing Sheets

(56) References Cited

U.S. PATENT DOCUMENTS

2014/0059558 A1  2/2014  Davis et al.
2014/0129808 A1  5/2014  Naveh et al.
2014/0189377 A1  7/2014  Subbareddy
2014/0189704 A1  7/2014  Narvaez et al.

OTHER PUBLICATIONS

Winter, et al., "Scalable Thread Scheduling and Global Power Management for Heterogeneous Many-Core Architectures", In Proceedings of PACT 2010, Available at <http://www.csl.cornell.edu/~albonesi/research/papers/pact10_2.pdf>,Sep. 2010, 11 pages.

* cited by examiner

HETEROGENEOUS THREAD SCHEDULING

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on. One challenge that faces developers of mobile computing devices is efficient power management and extension of battery life. For example, extended processing of tasks by processors at or near capacity may drain the device battery and create thermal conditions that may force shutdown of the device. Various power management strategies may be applied to control processor utilization, generally at the expense of overall device performance. If power management implemented for a device fails to strike a good balance between performance and battery life, user dissatisfaction with the device and manufacturer may result.

SUMMARY

Heterogeneous thread scheduling techniques are described in which a processing workload is distributed to heterogeneous processing cores of a processing system. The heterogeneous thread scheduling may be implemented based upon a combination of periodic assessments of system-wide power management considerations used to control states of the processing cores and higher frequency thread-by-thread placement decisions that are made in accordance with thread specific policies. In one or more implementations, an operational context is periodically analyzed for a processing system having heterogeneous cores including power efficient cores and performance oriented cores. Based on the periodic analysis, core states are set for at least some of the heterogeneous cores to control activation of the power efficient cores and performance oriented cores for thread scheduling. Then, individual threads are scheduled in dependence upon the core states to allocate the individual threads between active cores of the heterogeneous cores on a per-thread basis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
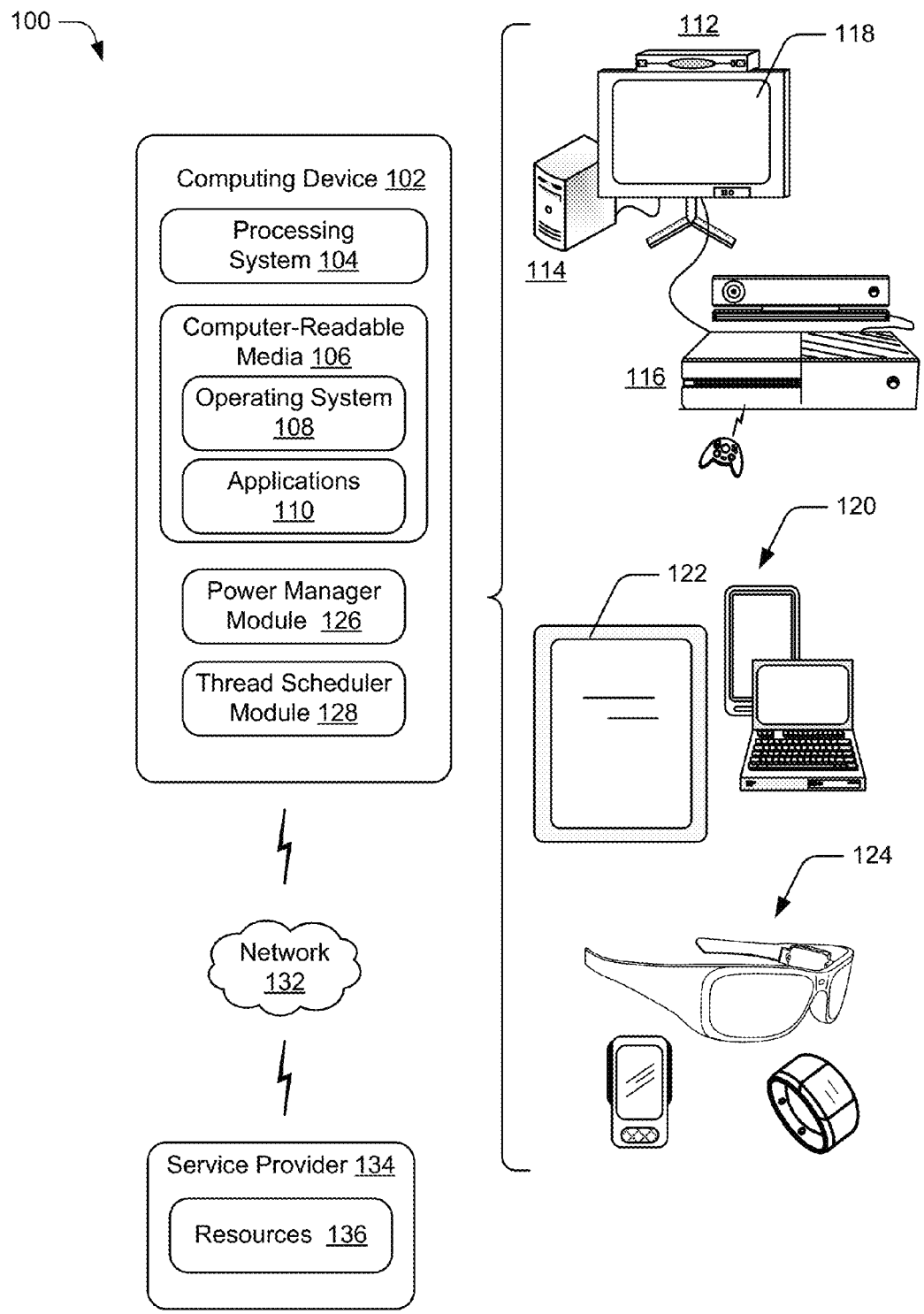
FIG. 1 illustrates an example operating environment in accordance with one or more implementations.

Generally, devices may implement power management strategies to control processor utilization and thermal conditions, but power management decisions may adversely affect device performance. Accordingly, users of a device may become frustrated if power management is poorly implemented and causes performance to suffer.

Heterogeneous thread scheduling techniques are described in which a processing workload is distributed to heterogeneous processing cores of a processing system. The heterogeneous thread scheduling may be implemented based upon a combination of periodic assessments of system-wide power management considerations used to control states of the processing cores and higher frequency thread-by-thread placement decisions that are made in accordance with thread specific policies. By way of example and not limitation, an operating system may include a power manager component configured to perform the periodic assessments and a thread scheduler component configured to make higher frequency thread-by-thread placement decisions under the influence of the power manager component.

In one or more implementations, an operational context is periodically analyzed for a processing system having heterogeneous cores including power efficient cores and performance oriented cores. Based on the periodic analysis, core states (e.g., active, idle, throttled, etc.) are set for at least some of the heterogeneous cores to control activation of the power efficient cores and performance oriented cores for thread scheduling. Then, individual threads are scheduled in dependence upon the core states to allocate the individual threads between active cores of the heterogeneous cores on a per-thread basis.

By combining both system-wide power management considerations and thread specific policies, heterogeneous thread scheduling techniques described herein may efficiently distribute a processing workload between a set of heterogeneous cores. Additionally, power usage may be optimized by intelligently switching between different cores, using power efficient cores more often, and/or placing unused or underutilized cores into idle states whenever possible. Moreover, performance oriented cores may be activated judiciously to service the processing workload and priority tasks within acceptable time constraints. Rather than merely switching wholesale between clusters of different cores (e.g., switch completely between performance cores and low power cores), combinations of cores having different characteristics may be activated together in various scenarios to optimize thread placement, device performance, and power usage.

In the discussion that follows, a section titled "Operating Environment" is provided and describes one example environment in which one or more implementations can be employed. Following this, a section titled "Heterogeneous Thread Scheduling Details" describes example details and procedures in accordance with one or more implementations. Last, a section titled "Example System" describes example computing systems, components, and devices that can be utilized for one or more implementations of heterogeneous thread scheduling.

Operating Environment

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may be configured to include multiple independent processors configured in parallel or in series and one or more multi-core processing units. A multi-core processing unit may have two or more processors ("cores") included on the same chip or integrated circuit. In one or more implementations, the processing system 104 may include a set of heterogeneous cores that provide a range of performance capabilities, processing efficiencies, and power usage characteristics, as described in greater detailed below.

The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, a smart band or watch, and a pod device such as clip-on fitness device, media player, or tracker. Other examples of wearable devices 124 include but are not limited to badges, a key fob, an access card, and a ring, an article of clothing, a glove, or a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 6.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 6.

The computing device 102 may also include a power manager module 126 and a thread scheduler module 128 that operate as described above and below. The power manager module 126 and thread scheduler module 128 may be provided using any suitable combination of hardware, software, firmware, and/or logic devices. As illustrated, the power manager module 126 and thread scheduler module 128 may be configured as separate, standalone modules. In addition or alternatively, the power manager module 126 and thread scheduler module 128 may be combined and/or implemented as a components of another module, such as being an integrated components of the operating system 108 or another application 110.

The power manager module 126 represents functionality operable to assess system-wide power management considerations and manage availability of processors and cores based on the assessment. This may involve analyzing factors including but not limited to the overall workload, thermal conditions, user presence, processor/core utilization and utility, level of concurrent use of processors/cores or "concurrency", application context, device context, priority, contextual clues, and other performance metrics that may be used to drive power management decisions at the system level. The power manager module 126 may be configured to apply a power management policy to adjust the performance of the processing system 104 based on the assessment of system-wide performance metrics and conditions. This may involve controlling the states and/or availability of heterogeneous cores included with a processing system 104. For example, the power manager module 126 may selectively set core states to "park" unused cores in low power modes ("parked" or "restricted" state) and "unpark" cores under high workload demand into higher power modes ("unparked" or "available" states). The power manager module 126 may also communicate indications regarding the selection of parked and unparked cores to other components to convey availability of the cores to do work until the next assessment.

The thread scheduler module 128 represent functionality operable to manage allocation of the processing workload across available processing resources. This may include queuing, scheduling, prioritizing, and dispatching units of work referred to as "threads" across available processors and/or cores. The thread scheduler module 128 is configured to make relatively high frequency thread-by-thread placement decisions to allocate the workload across cores of the processing system in accordance with thread specific policies. The thread-by-thread placement decisions may be made under the influence of the power manager module 126. For example, placement of threads by the thread scheduler module 128 may be restricted to a subset of the heterogeneous cores in accordance with system-wide power management assessments made by the power manager module 126. In other words, the thread scheduler module 128 may be limited to cores that the power manager module 126 makes available for thread scheduling (e.g., unparked cores). Details regarding these and other aspects of heterogeneous thread scheduling are discussed in the following section.

The environment 100 further depicts that the computing device 102 may be communicatively coupled via a network 130 to a service provider 132, which enables the computing device 102 to access and interact with various resources 134 made available by the service provider 132. The resources 134 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations of heterogeneous thread scheduling.

Heterogeneous Thread Scheduling Details

To further illustrate, consider the discussion in this section of example devices, components, procedures, and implementation details that may be utilized to provide heterogeneous thread scheduling as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples in this description.

Example Device

Figure 2:
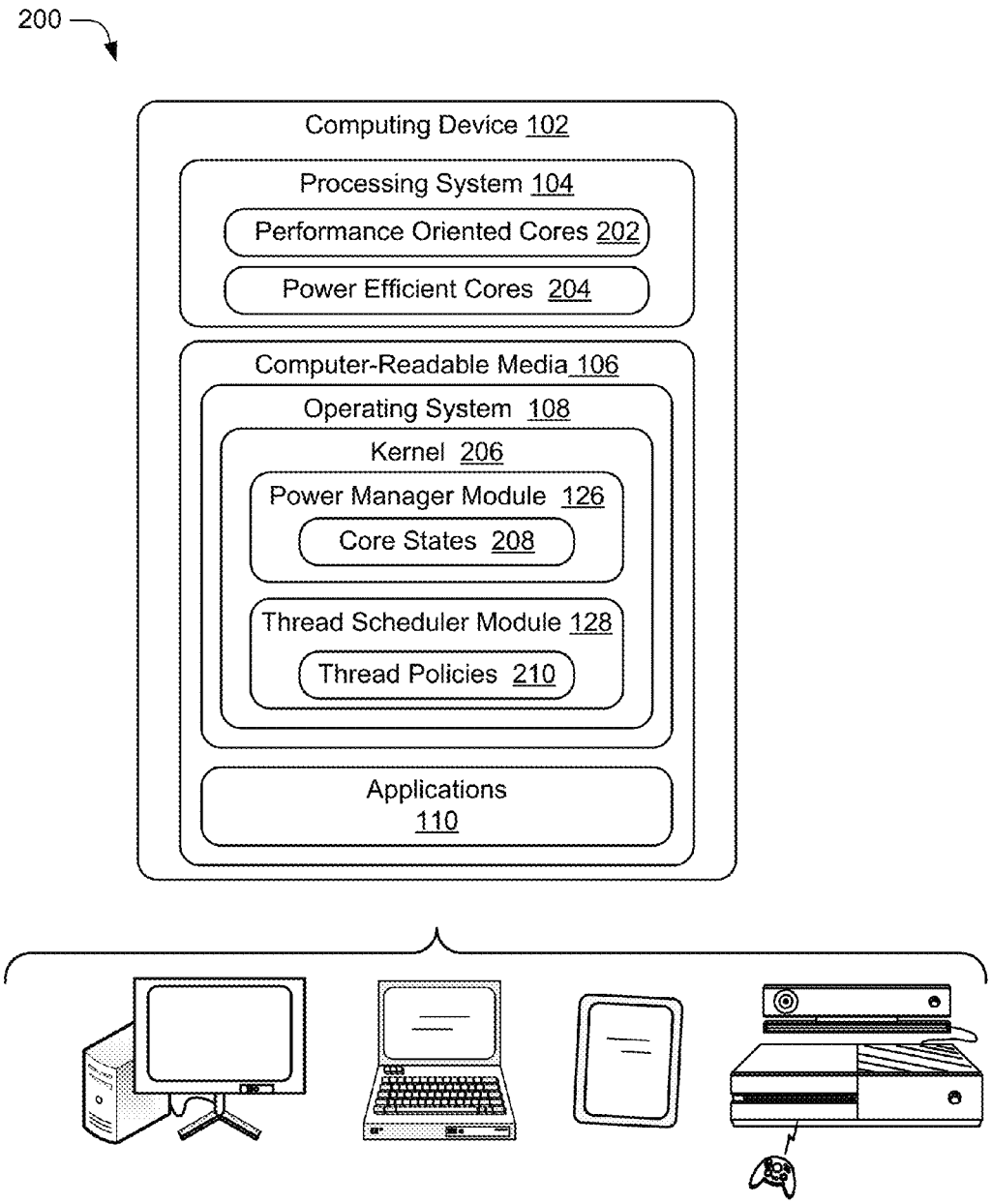
FIG. 2 is diagram depicting example details of a computing device having heterogeneous processing cores in accordance with one or more implementations.

FIG. 2 depicts generally at 200 example details of a computing device 102 having heterogeneous cores in accordance with one or more implementations. By way of example and not limitation, the processing system 104 is depicted as having performance oriented cores 202 and power efficient cores 204. The performance oriented cores 202 are representative of cores designed for high performance and the power efficient cores 204 are representative of cores designed to consume low power. Generally, the performance oriented cores 202 are configured to reduce processing time for completion of particular tasks/threads relative to the power efficient cores 204. Likewise, the power efficient cores 204 are configured to consume less power for completion of particular tasks/threads relative to the performance oriented cores 204. Although two different types of cores are represented, additional types of core having different properties may be included, such as one or more types of cores configured to provide different levels of balance between performance and power efficiency. Accordingly, a processing system 104 may include a set of heterogeneous cores that provide a range of performance capabilities, processing efficiencies, and power usage characteristics. Heterogeneous thread scheduling described herein may be applied to any suitable configuration of heterogeneous cores for a processing system 104.

By way of example and not limitation, the power manager module 126 and thread scheduler module 128 are illustrated in FIG. 2 as being implemented as components of an operating system 108. For example, the power manager module 126 and thread scheduler module 128 may be implemented as low-level system components of a kernel 206 of the operating system 108. Other implementations as components of the operating system 108 or otherwise are also contemplated. As noted above, the power manager module 126 is representative of functionality operable to make system-wide power management assessments based on various performance metrics, examples of which are noted above and below. Then, the power manager module 126 may set core states 208 associated with the heterogeneous cores to activate or deactivate cores as appropriate. Core states 208 may include parked or restricted states, and unparked or unrestricted states, as mentioned previously. Other intermediate states are also contemplated, such as "throttled" states in which cores may be set to operate at some percentage or fraction of full performance. Thus, the power manager module 126 may implement a power management policy that relates operational contexts as indicated by the performance metrics to power management actions and core states, and direct cores to enter corresponding state in accordance with the power management policy. In one or more implementation, the power manager module 126 may operate to make assessments on aperiodic interval to control availability of cores during the next interval (e.g., prior to the next assessment). Naturally, on demand and non-periodic assessments may also be employed. Additional details regarding power management assessments, core states, and other functionality represented by the power manager module 126 can be found in relation to the following example procedures.

As noted above, the thread scheduler module 128 represents functionality operable to manage allocation of the processing workload across available processing resources. Placement decisions made via the thread scheduler module 128 are generally made thread-by-thread at a frequency higher than assessments made by the power manager module 126. By way of example and not limitation, threads may be scheduled in intervals of under about 10 milliseconds, whereas power management assessments may occur at intervals of about 30 milliseconds or greater.

The thread scheduler module 128 may be configured to assign and apply thread policies 208 to allocate work among a subset of heterogeneous cores made available by the power manager module 126. The thread policies 208 reflect thread specific strategies for placing work on different types of cores of heterogeneous cores included with a processing system 104. Thread policies 208 may be assigned based on various criteria such as application type, priority, activity type, thread categories, task size, time deadlines, and other parameters that may be suitable to categorize threads and processes. The thread policies are configured to account for asymmetric properties of the heterogeneous cores, such as different performance capabilities, processing efficiencies, and power usage characteristics associated with different types of cores.

In an implementation, a plurality of different thread policies 208 may be defined and supported by the system. Thread policies may be indicated via a policy attribute associated with threads, such as by setting the value of a parameter to different numeric values that are indicative of a corresponding thread policies. Thread policies may be selected or requested by applications. In addition or alternatively, the thread scheduler module 128 may assess various criteria as noted above and match individual threads to appropriate policies. The thread scheduler module 128 may also be configured to override policies that are specified by applications. Additional details regarding thread scheduling, thread policies 208, and other functionality represented by the thread scheduler module 128 can be found in relation to the following example procedures.

Example Procedures

Figure 3:
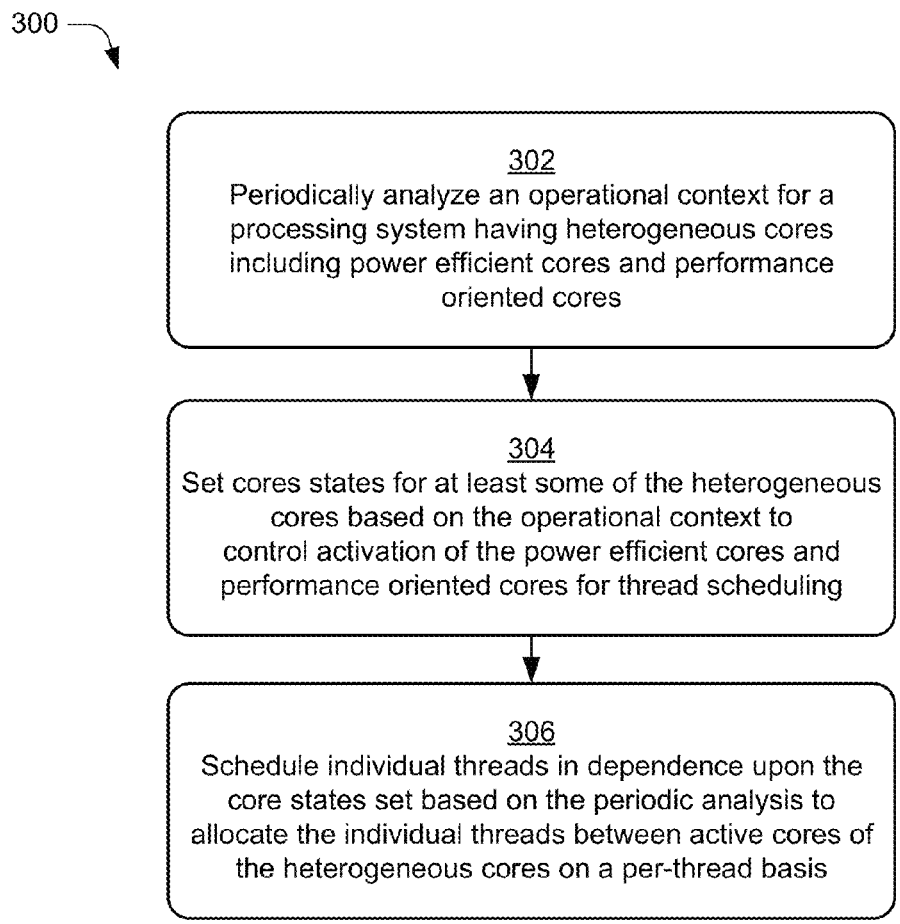
FIG. 3 is a flow diagram that describes details of an example procedure for allocation of threads among heterogeneous core in accordance with one or more implementations.
Figure 4:
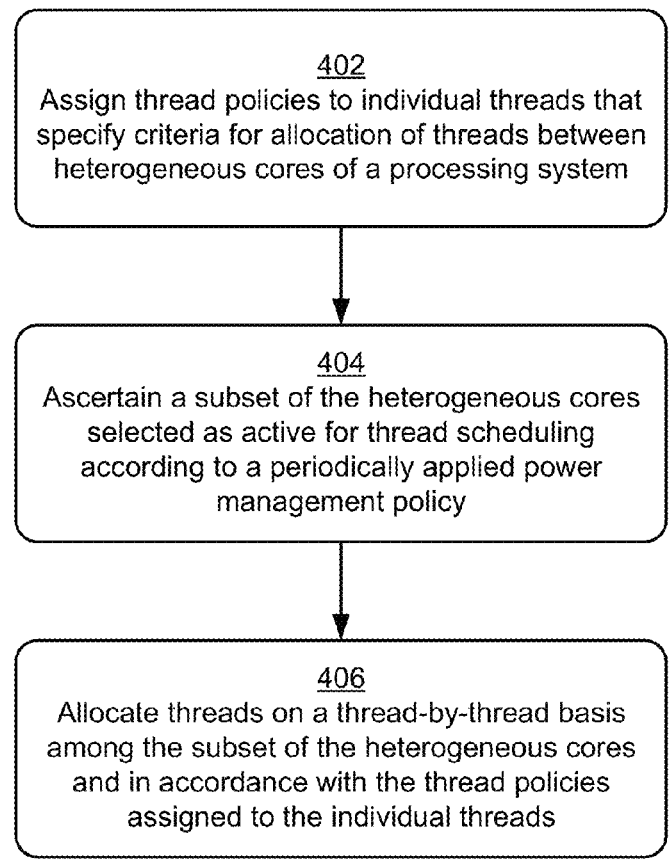
FIG. 4 is a flow diagram that describes details of an example procedure for thread scheduling based on thread policies in accordance with one or more implementations.
Figure 5:
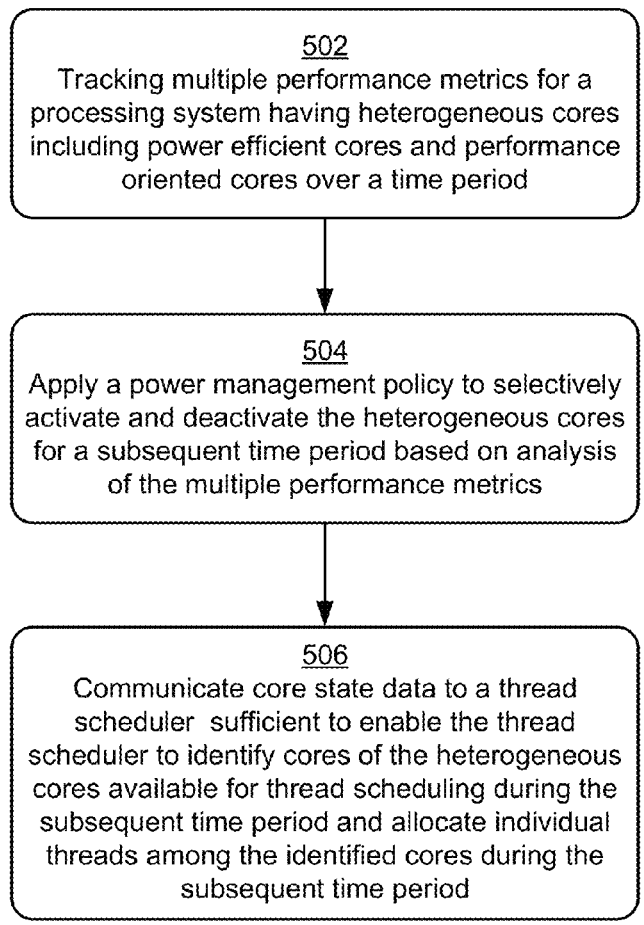
FIG. 5 is a flow diagram that describes details of an example procedure for selectively controlling states of heterogeneous cores of a processing system in accordance with one or more implementations.

Additional aspects of heterogeneous thread scheduling techniques are discussed in relation to example procedure of FIGS. 3 to 5. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

FIG. 3 is a flow diagram that describes details of an example procedure 300 for allocation of threads among heterogeneous core in accordance with one or more implementations. The procedure 300 can be implemented by way of a suitably configured computing device, such as by way of an operating system 108 and/or other functionality described in relation to the example computing devices of FIG. 1 and FIG. 2. Individual operations and details discussed in relation to procedure 300 may also be combined in various ways with operations and details discussed herein in relation to the example procedures of FIG. 4 and FIG. 5.

An operational context for a processing system having heterogeneous cores including power efficient cores and performance oriented cores is periodically analyzed (block 302). For example, an operating system 108 may be configured to assess performance metrics to recognize an operational context and make system wide power management decisions for a device based on the operational context. By way of example and not limitation, the operational context may reflect a combination of one or more of the overall workload, workload distribution among processors/cores, thermal conditions, indications of user presence, power availability (e.g., battery level, power supply connection, etc.), application type, work categories, priority settings, and so forth. The assessments may be made via a power manager module 126 as described herein, or comparable functionality.

Cores states are set for at least some of the heterogeneous cores based on the operational context to control activation of the power efficient cores and performance oriented cores for thread scheduling (block 304). For instance, a processing system 104 that is the subject of analysis may include heterogeneous cores that may be selectively activated or deactivated based upon analysis of the operational context and a power management policy. The power management policy may be configured to define which cores of a heterogeneous system are parked and unparked in different operational contexts. For example, in a low battery state one or more performance oriented cores may be parked in an idle state to conserve power and/or one or more power efficient cores may be unparked into active states to service the workload. In another example, any type of core that reaches a temperature threshold may be parked to avoid overheating and damage. When one or more cores are parked, states of other cores may be adjusted accordingly to provide capacity to handle the current workload. Various different combinations of different types of cores of a heterogeneous system may be designated by the power management policy for handling different operational contexts. Here, the operating system 108 may be configured to apply the policy responsive to recognition of the operational context to direct corresponding changes in the core states specified by the power management policy. The power management policy may reflect design decisions to strike a balance between performance and power usage. Moreover, the power management policy may be configurable by developers and/or users to shift the balance more towards performance or more towards efficient power usage. Additional details regarding application of a power management policy and controlling states of heterogeneous cores are discussed below in relation to the example procedure of FIG. 5.

Thread scheduling for the heterogeneous cores may be performed under the influence of the power management policy and core state selections made based on the operational context. In particular, individual threads are scheduled in dependence upon the core states set based on the periodic analysis to allocate the individual threads between active cores of the heterogeneous cores on a per-thread basis (block 306). For example, an operating system 108 may include a thread scheduler module 128 or comparable functionality configured to make high frequency thread placement decisions as discussed previously. The thread placement may be constrained to a subset of the heterogeneous cores that are made available for thread scheduling based on periodic evaluation of the system wide power management policy. Moreover, thread policies 210 associated with individual threads may designate a preferred set of cores to use if available and/or a permissible set of cores that can be used in the event preferred cores are not available. The thread policies 210 may be configured in various ways to specify combinations of heterogeneous cores, one or more different types of cores, and/or particular individual cores on which a corresponding thread is permitted to run. In accordance with thread policies, priority may be given to the preferred cores, if designated, and then cores may be selected from a wider set of permissible cores, if designated. Additional details regarding application of thread policies and high frequency thread placement decisions are discussed below in relation to the example procedure of FIG. 4.

FIG. 4 is a flow diagram that describes details of an example procedure 400 for thread scheduling based on thread policies in accordance with one or more implementations. The procedure 400 can be implemented by way of a suitably configured computing device, such as by way of a thread scheduler module 128 and/or other functionality described in relation to the example computing devices of FIG. 1 and FIG. 2. Individual operations and details discussed in relation to procedure 400 may also be combined in various ways with operations and details discussed herein in relation to the example procedures of FIG. 3 and FIG. 5.

Thread policies are assigned to individual threads that specify criteria for allocation of threads between heterogeneous cores of a processing system (block 402). For example, a thread scheduler module 128 may operate to establish, maintain, and assign thread policies to threads as part of high frequency (e.g., thread-by-thread) placement decisions described throughout this document. The thread policies 210 may be configured in various ways to specify combinations of heterogeneous cores, one or more different types of cores, and/or particular individual cores on which a corresponding thread is permitted to run. In one or more implementations, thread policies are used to generate compact representations that map permitted cores to threads, such as by using a bit map, data string, thread properties, mapping database, or other suitable data structure configured to indicate core affinities that may include indications of preferred cores, permitted cores, and/or restricted cores on a thread-by-thread basis.

Various criteria may be employed to set-up and assign thread policies. For example, thread policies may be established based upon one or more of application type, priority, activity type, thread categories, task size, time deadlines, user visibility indications, and/or other combinations of parameters suitable to categorize threads and processes. Thus, thread policies 210 may be configured to control distribution of individual threads and the overall workload among a set of heterogeneous cores that provide a range of performance capabilities, processing efficiencies, and power usage characteristics, as described in greater detailed below. In other words, the heterogeneous cores may include two or more different types of cores having different performance, efficiency, and/or power usage characteristics.

For example, thread policies may be established to cause placement of low priority threads to power efficient cores whereas threads with time deadlines and high priority may be placed with performance oriented cores. Different combinations of cores may also be specified for different kinds of applications and types of work. Thread policies may be established to implement various design goals including but not limited to ability to tune scheduling choices between power and performance, favoring performance in visible scenarios to demonstrate device capabilities to users, minimizing power usage in situations in which users may not notice a performance difference, partitioning the workload across the subset of cores made available for scheduling to the extent possible to speed-up threads that may have potential for significant performance impact, and/or providing a balance between performance and power usage under typical operating conditions by using and quickly switching between a mix of different heterogeneous cores having varying characteristics.

In addition, the thread policies may correspond to different thread categories organized around combinations of criteria, some examples of which were mentioned above. For example, application launching threads, message notification threads, and web page download threads may be placed on performance oriented cores to give a quick feel. On the other hand, background tasks, such a downloads of updates, extended installs, and other long running threads may be placed on power efficient cores since these task may be less time sensitive and/or visible to users. Thread policies may be used to identify cores of the heterogeneous system that may be used with individual threads.

In another example, interaction classes may be defined that organize different types of threads into categories based on expected responsiveness. By way of example, a set of interaction classes may include an instant class for brief running threads (e.g., approximately 50 to 300 milliseconds) that may not be long enough to impact performance significantly, a typical class for somewhat longer running (e.g., approximately 300 to 1000 milliseconds) repetitive scenarios and scenarios with high visibility that may have more performance impact, a responsive class for threads with substantial workloads (e.g., approximately 1 to 10 seconds) that may benefit significantly from performance boosts, and an extended class for long running threads (e.g., approximately 10 to 600 seconds) which may have thermal constraints and extended timeframes and relatively low potential for performance gains, and therefore are good candidates to be deprioritized. Scheduling strategies to handle the different interaction classes and select between heterogeneous cores may then be reflected by thread policies associated with the interaction classes.

As mentioned above, thread policies may be indicated via a policy attribute associated with threads, such as by setting the value of a policy attribute to different numeric values that are indicative of a corresponding thread policies. Moreover, the policy attribute be configured to designate core affinities such as a preferred set of cores to use if available and/or a permissible set of cores that can be used in the event preferred cores are not available.

Consider an illustrative example in which different thread policies may be established and indicated for scheduling on a heterogeneous system having two types of cores, such as the example computing device of FIG. 2 having performance oriented cores 202 and power efficient cores 204. In this example, six different policies are defined and associated with threads using a policy attribute as mentioned above that may take on values between "0" and "5". The value of 0 indicates that no policy is defined for the thread in which case the thread may be placed on any available core irrespective of the type of core. A value of 1 indicates that placement is based upon evaluation of criteria. In this case, the thread scheduler module 128 may operate to evaluate priority, core utilizations, workload and other considerations to place the thread. The value of 1 effectively defers the decision making to the thread scheduler module 128. A value of 2 designates that performance oriented cores 202 are to be used even if none are currently available. In other words, the value of 2 indicates that power efficient cores 204 should not be used. A value of 3 indicates that performance oriented cores 202 are preferred but idle power efficient cores 204 may also be used based on core availability. A value of 4 indicates that power efficient cores 204 are to be used even if none are currently available (e.g., do not use performance oriented cores 202). A value of 5 indicates power efficient cores 204 are preferred but idle performance oriented cores 202 may also be used based on core availability. Naturally, the number and kinds of different policies may vary in different implementations. Additionally, comparable policies may be established for other heterogeneous systems that may have more than two different types of cores that are available for scheduling.

A subset of the heterogeneous cores selected as active for thread scheduling according to a periodically applied power management policy is ascertained (block 404). For example, the thread scheduler module 128 may obtain indications regarding core state data in any suitable way. The core state data may be configured in various ways to indicate cores that are available for scheduling during a current time period, such as by using a bit map, table, binary string, mapping database, or other representation to indicates states, such as parked or unparked. The core state data may generated based on assessments of system-wide power management as discussed previously in this document as well as in relation to the example procedure of FIG. 5 that follows. For example, the thread scheduler module 128 may receive core state data via a call from the power manager module 126 configured to provide the indication regarding cores states for heterogeneous cores. The thread scheduler module 128 may then analyze the core state data to determine the subset of the heterogeneous cores that are available for scheduling.

Threads are allocated on a thread-by-thread basis among the subset of the heterogeneous cores and in accordance with the thread policies assigned to the individual threads (block 406). For example, the thread scheduler module 128 may perform scheduling using the thread policies associated with different threads under the constraints imposed by application of the power management policy. In particular, the thread scheduler module 128 is restricted to scheduling using the subset of the heterogeneous cores ascertained per block 404. The scheduling may therefore involve reconciling the core state data that indicates available cores with the thread policies which indicates core affinities for each thread to derive usable cores for each scheduling event. The set of usable cores reflects the intersection between availability indicated by the core state data and core affinities reflected by the thread policies. Thus, the thread policy assigned to a particular thread may be used to determine core affinities for the particular thread and the thread may be placed with one of the heterogeneous cores in accordance with the core affinities that are determined.

Generally, both the system wide constraints reflected by the core state data and thread-by-thread affinities reflected by the thread policies are adhered to in the scheduling process. In one approach, unparked and idle cores may be targeted over parked or active cores and cores associated with a thread's assigned preferences may be selected first. If there are no preferred cores idle, the thread may be scheduled using idle permissible cores. Placement of a core in accordance with the thread affinities is dependent upon finding a suitable idle core within the usable cores. In the event that there are no preferred cores or permissible cores available for placement, then scheduling may be switched to priority-based scheduling to allocate threads across unparked cores. The priority-based scheduling may target the set of permissible cores and/or may involve applying an override algorithm to schedule threads on the already busy processors.

FIG. 5 is a flow diagram that describes details of an example procedure 500 for selectively controlling states of heterogeneous cores of a processing system in accordance with one or more implementations. The procedure 500 can be implemented by way of a suitably configured computing device, such as by way of a power manager module 126 and/or other functionality described in relation to the example computing devices of FIG. 1 and FIG. 2. Individual operations and details discussed in relation to procedure 500 may also be combined in various ways with operations and details discussed herein in relation to the example procedures of FIG. 3 and FIG. 4.

Multiple performance metrics for a processing system having heterogeneous cores including power efficient cores and performance oriented cores are tracked over a time period (block 502). Then, a power management policy is applied to selectively activate and deactivate the heterogeneous cores for a subsequent time period based on analysis of the multiple performance metrics (block 504). For example, a power manager module 126 may operate to track various performance metrics that are indicative of an operational context for a processing system as part of periodic power management assessments described throughout this document. Various types and combinations of metrics are contemplated, examples of which were previously discussed. The power manager module 126 may then utilize the metrics that are tracked to make relatively low frequency power management assessments and control activation states for heterogeneous cores accordingly. This may involve causing changes in cores states for power efficient cores and performance oriented cores in accordance with a power management policy.

Core state data is communicated to a thread scheduler sufficient to enable the thread scheduler to identify cores of the heterogeneous cores available for thread scheduling during the subsequent time period and allocate individual threads among the identified cores during the subsequent time period (block 506). For example, power manager module 126 may generate core state data indicative of parked and unparked cores that may be configured in various forms. By way of example, core states 208 for a system of heterogeneous cores may be conveyed to the thread scheduler module 128 and/or other components via a bit map, table, binary string, mapping database, a list of core IDs, a matrix, or other representation. The thread scheduler module 128 may then utilize the core state data to derive a subset of cores available for scheduling as discussed in relation to the procedure of FIG. 4 above, and elsewhere in this document In one or more implementations, the metrics used for system level power management may include at least a utility factor and a concurrency factor for the heterogeneous cores tracked over the time period. The utility factor is an indication of how much work is being performed over the time period and may be proportional to utilization of the heterogeneous cores (e.g., how occupied the cores are during the time period) and to the performance level of the heterogeneous cores (e.g. the frequencies at which the cores are running) The concurrency factor is an indication of the amount of time multiple cores of the heterogeneous cores are running together. In this case, decisions regarding which cores to activate and/or deactivate a subsequent time period may depend upon a combination of at least core utility and core concurrency factors. The core utility and core concurrency factors may be used to compute the numbers and types of cores of the heterogeneous system to park and unpark for the subsequent time period. A variety of power management policies and corresponding core activation algorithms configured to incorporate core utility and core concurrency factors in various ways are contemplated.

Example Core Activation Algorithm

To further illustrate, consider the following example core activation algorithm that may be employed in one or more implementations to selectively park and unpark cores. The example core activation algorithm is provided as but one illustrative example and the techniques described herein are not intended to be limited to the example algorithm.

In accordance with the preceding discussion, the example core activation algorithm uses a combination of total utility and concurrency of the prior period to select core states for the next period. The total utility is distributed over the putative utilization of the active cores, assuming the utilization is packed onto the smallest possible number of cores given a histogram representation of the concurrent activity of the cores. This utility is then checked against a set of thresholds to determine cores to park or unpark for the next period. For example, thresholds may be established to control whether to increase or decrease the total number of cores and/or each individual type of core. The increase and decrease thresholds can be chosen independently for different types of cores. With respect to each particular core type, thresholds may also be chosen independently for the first core versus subsequent cores to allow for policies that account for a higher cost to unpark the first performance oriented core (since the second core may share common power resources with the first core) than to unpark subsequent performance oriented cores. Similarly, a unique threshold could be applied for unparking a third or later high-performance core.

In this context, the count of unparked cores may be computed in the following manner:

Core Count Calculation

N is the total number of cores on the system.

$C_i$ is the amount of time spent with i cores running simultaneously, called concurrent time.

$U_T$ is the total utility achieved on the machine.

T is the total elapsed time:

$$T = \sum_{i=o}^{N} C_i$$

$Z_k$ is the utilization the k'th processor, assuming all the work is packed on the smallest set of processors that could meet the distribution of concurrent time.

$$Z_k = \sum_{i=k}^{N} \frac{C_i}{T}$$

$Z_T$ is the total utilization of the system (where 1 represents a single fully occupied processor):

$$Z_T = \sum_{i=1}^{N} i * \frac{C_i}{T}$$

$U_i$ is estimated utility of the i'th core assuming close packing and distribution of utility proportional to utilization:

$$U_i = \frac{U_T Z_i}{Z_T}$$

$U_i$ is compared to an upper "increase" threshold (which can be set individually per value of i, e.g., per core) to determine if a core should be unparked. If $U_i$ it is below this threshold, it is compared to a different, lower "decrease" threshold to determine if a core should be parked. Thus, the utility for one or more individual cores may be computed based on a total utility factor and a concurrency factor for the heterogeneous cores. Utility for the one or more individual cores is then compared to thresholds set for the cores to determine whether to activate or deactivate the cores. For instance, if the utility exceeds an upper threshold the core may be unparked (e.g., activated). If the utility is below a lower threshold the core may be parked (e.g., deactivated).

In the case of a system having a combination of performance oriented cores and power efficient cores, the foregoing utility computation may be used to determine the number and cores states for the performance oriented cores. In some implementations, comparable utility computations and thresholds may be used to determine the number and cores states for other types of cores, including the power efficient cores.

To avoid anomalies in which a core's utility can be offset by other types of cores running at a lower frequency the actual measured utility of the i'th most utilized core may be used if it is higher than the estimated utility. Additionally, for quick response to demands for performance, the core activation algorithm may configured to increase the available count of performance oriented cores (or other type of cores) after a single cycle of observed demand. However, decreasing the number cores may require multiple cycles of observed lighter demand. For example, the core activation algorithm may be set to observe three consecutive cycles of low demand before parking cores. The number of cycles to both increase and decrease core counts may be controlled according to configurable parameters.

Having considered the foregoing example details and techniques, consider now a discussion of an example system and components that may be employed in one or more implementations of or heterogeneous thread scheduling.

Example System

Figure 6:
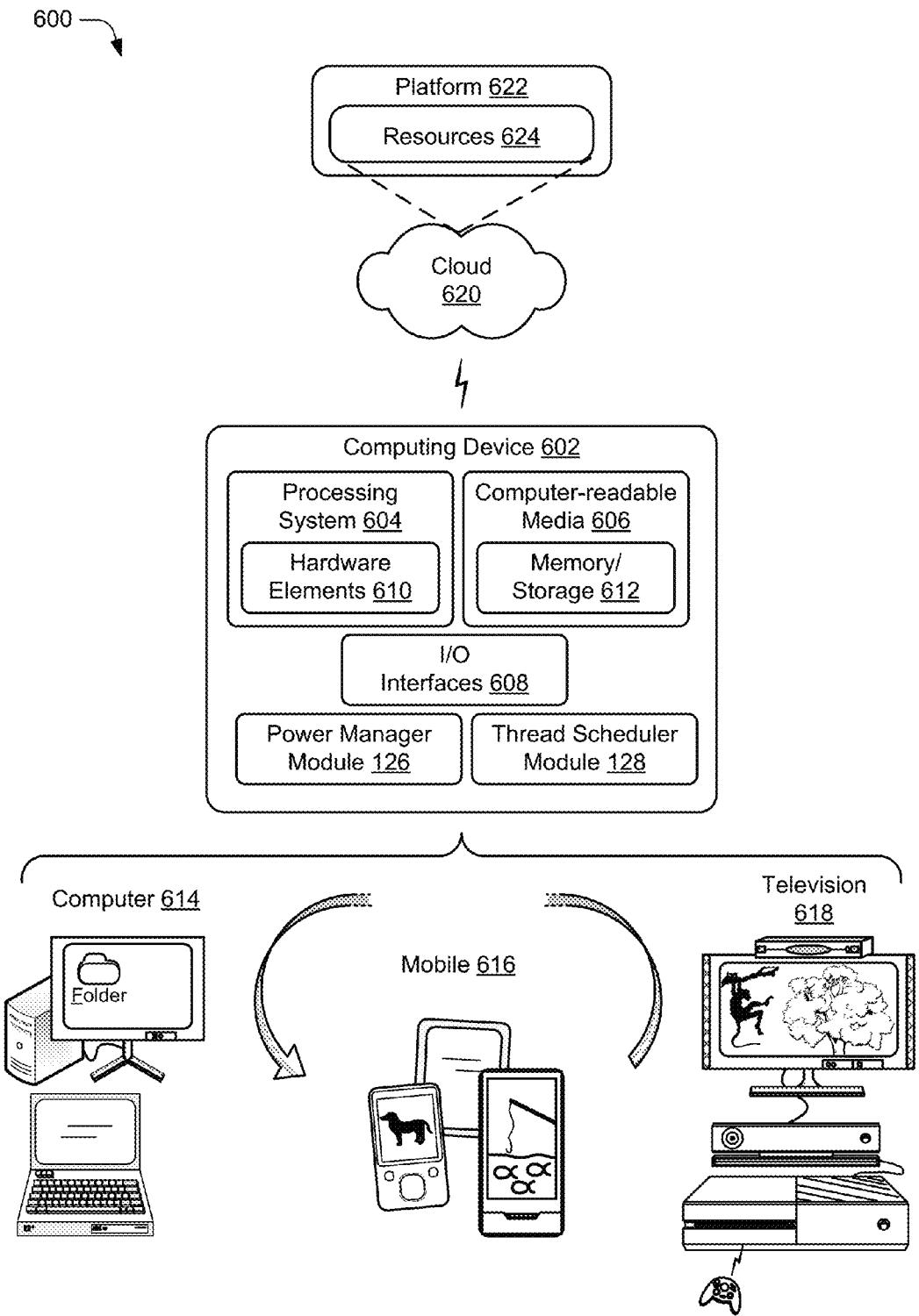
FIG. 6 is a block diagram of a system that can be employed for heterogeneous thread scheduling in accordance with one or more implementations.

FIG. 6 illustrates an example system 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, power manager module 126, thread scheduler module 128, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the power manager module 126 and thread scheduler module 128 on the computing device 602. The functionality represented by power manager module 126, thread scheduler module 128, and other modules/applications may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Example Implementations

Examples implementations of heterogeneous thread scheduling techniques described herein include, but are not limited to, one or any combinations of one of more of the following examples:

A method implemented by a computing device comprising: assigning thread policies to individual threads, the thread policies specifying criteria for allocation of threads between heterogeneous cores of a processing system; ascertaining a subset of the heterogeneous cores selected as active for thread scheduling according to a periodically applied power management policy; and allocating threads on a thread-by-thread basis among the subset of the heterogeneous cores and in accordance with the thread policies assigned to the individual threads.

A method as described above, wherein the heterogeneous cores include at least performance oriented cores and power efficient cores, the performance oriented cores configured to reduce processing time for completion of particular tasks relative to the power efficient cores and the power efficient cores configured to consume less power for completion of particular tasks relative to the performance oriented cores.

A method as described above, wherein the criteria for allocation of threads include one or more of application type, priority, activity type, thread categories, task size, or time deadlines.

A method as described above, wherein ascertaining the subset of the heterogeneous cores includes obtaining core state data that is generated based on application of the power management policy and configured to indicate cores that are available for scheduling during a current time period.

A method as described above, wherein allocating threads comprises: generating a preferred set of cores and a permissible set of cores for a particular thread based upon the thread policy assigned to the particular thread; placing the thread on a core of the preferred set of cores if at least one of the preferred set of cores is in the subset and available for scheduling; or placing the thread on a core of the permissible set of cores if at least one of the preferred set of cores is not available and at least one of the permissible set of cores is in the subset and available for scheduling.

A method as described above, wherein assigning thread policies further comprises setting the value of a policy attribute for individual threads to different numeric values to indicate at least one of preferred cores, permitted cores, or restricted cores on a thread-by-thread basis.

A method as described above, wherein the thread policies are configured to account for asymmetric properties of the heterogeneous cores.

A method as described above, wherein the heterogeneous cores of the processing system include more than two different types of cores.

A method implemented by a computing device comprising: tracking multiple performance metrics for a processing system having heterogeneous cores including power efficient cores and performance oriented cores over a time period; applying a power management policy to selectively activate and deactivate the heterogeneous cores for a subsequent time period based on analysis of the multiple performance and system state metrics; and communicating core state data to a thread scheduler sufficient to enable the thread scheduler to identify cores of the heterogeneous cores available for thread scheduling during the subsequent time period and allocate individual threads among the identified cores during the subsequent time period.

A method as described above, wherein applying the power management policy comprises: causing changes in cores states for the power efficient cores and the performance oriented cores; and generating the core state data configured to convey the cores states to other components.

A method as described above, wherein the performance metrics include at least a utility factor and a concurrency factor for the heterogeneous cores measured over the time period.

A method as described above, further comprising recognizing an operational context for the computing device based on the analysis of the performance metrics, the operational context indicative of a combination of one or more of overall workload, workload distribution among cores, thermal conditions, indications of user presence, power availability, application type, work categories, or priority settings.

A method as described above, wherein the power management policy is configured to define which cores of the heterogeneous cores are parked and unparked in different operational contexts indicated by the tracking of multiple performance metrics.

A method as described above, wherein applying the power management policy to selectively activate and deactivate the heterogeneous cores comprises: computing utility for one or more individual cores based on a utility factor and a concurrency factor for the heterogeneous cores; comparing the utility computed for the one or more individual cores to thresholds set for the cores to determine whether to activate or deactivate the cores.

A method as described above, wherein the heterogeneous cores of the processing system provide a range of different performance capabilities, processing efficiencies, and power usage characteristics.

A computing device comprising: a processing system having heterogeneous cores including at least power efficient cores and performance oriented cores; and an operating system including one or more modules operable via the processing system to perform operations for managing performance of a processing workload via the heterogeneous cores including: periodically analyzing an operational context for the processing system; setting core states for at least some of the heterogeneous cores based on the periodic analysis to control activation of the power efficient cores and performance oriented cores for thread scheduling; and scheduling individual threads in dependence upon the core states set based on the periodic analysis to allocate the individual threads between active cores of the heterogeneous cores on a per-thread basis.

A computing device as described above, wherein the scheduling occurs at a frequency greater than the periodic analysis.

A computing device as described above, wherein the one or more modules include: a power manager module configured to perform the periodically analyzing and setting of cores states; and a thread scheduler module configured to perform the scheduling in dependence upon the core states.

A computing device as described above, wherein periodically analyzing the operational context includes tracking workload, thermal conditions, indications of user presence, and power availability.

A computing device as described above, wherein scheduling of the individual threads includes, for each particular thread: using a thread policy assigned to the particular thread to determine core affinities for the particular thread; and placing the particular thread with one of the heterogeneous cores in accordance with the core affinities that are determined.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by a computing device comprising:
    assigning thread policies to individual threads, the thread policies specifying criteria for allocation of threads between heterogeneous cores of a processing system;
    ascertaining a subset of the heterogeneous cores selected as active for thread scheduling according to a periodically applied power management policy; and
    allocating threads on a thread-by-thread basis among the subset of the heterogeneous cores and in accordance with the thread policies assigned to the individual threads.

2. The method of claim 1, wherein the heterogeneous cores include at least performance oriented cores and power efficient cores, the performance oriented cores configured to reduce processing time for completion of particular tasks relative to the power efficient cores and the power efficient cores configured to consume less power for completion of particular tasks relative to the performance oriented cores.

3. The method of claim 1, wherein the criteria for allocation of threads include one or more of application type, priority, activity type, thread categories, task size, or time deadlines.

4. The method of claim 1, wherein ascertaining the subset of the heterogeneous cores includes obtaining core state data that is generated based on application of the power management policy and configured to indicate cores that are available for scheduling during a current time period.

5. The method of claim 1, wherein allocating threads comprises:
    generating a preferred set of cores and a permissible set of cores for a particular thread based upon the thread policy assigned to the particular thread;
    placing the thread on a core of the preferred set of cores if at least one of the preferred set of cores is in the subset and available for scheduling; or
    placing the thread on a core of the permissible set of cores if at least one of the preferred set of cores is not available and at least one of the permissible set of cores is in the subset and available for scheduling.

6. The method of claim 1, wherein assigning thread policies further comprises setting the value of a policy attribute for individual threads to different numeric values to indicate at least one of preferred cores, permitted cores, or restricted cores on a thread-by-thread basis.

7. The method of claim 1, wherein the thread policies are configured to account for asymmetric properties of the heterogeneous cores.

8. The method of claim 1, wherein the heterogeneous cores of the processing system include more than two different types of cores.

9. A method implemented by a computing device comprising:
    tracking multiple performance metrics for a processing system having heterogeneous cores including power efficient cores and performance oriented cores over a time period;
    applying a power management policy to selectively activate and deactivate the heterogeneous cores for a subsequent time period based on analysis of the multiple performance and system state metrics; and
    communicating core state data to a thread scheduler sufficient to enable the thread scheduler to identify cores of the heterogeneous cores available for thread scheduling during the subsequent time period and allocate individual threads among the identified cores during the subsequent time period.

10. The method of claim 9, wherein applying the power management policy comprises:
    causing changes in cores states for the power efficient cores and the performance oriented cores; and
    generating the core state data configured to convey the cores states to other components.

11. The method of claim 9, wherein the performance metrics include at least a utility factor and a concurrency factor for the heterogeneous cores measured over the time period.

12. The method of claim 9, further comprising recognizing an operational context for the computing device based on the analysis of the performance metrics, the operational context indicative of a combination of one or more of overall workload, workload distribution among cores, thermal conditions, indications of user presence, power availability, application type, work categories, or priority settings.

13. The method of claim 9, wherein the power management policy is configured to define which cores of the heterogeneous cores are parked and unparked in different operational contexts indicated by the tracking of multiple performance metrics.

14. The method of claim 9, wherein applying the power management policy to selectively activate and deactivate the heterogeneous cores comprises:
    computing utility for one or more individual cores based on a utility factor and a concurrency factor for the heterogeneous cores;
    comparing the utility computed for the one or more individual cores to thresholds set for the cores to determine whether to activate or deactivate the cores.

15. The method of claim 9, wherein the heterogeneous cores of the processing system provide a range of different performance capabilities, processing efficiencies, and power usage characteristics.

16. A computing device comprising:
    a processing system having heterogeneous cores including at least power efficient cores and performance oriented cores; and
    an operating system including one or more modules operable via the processing system to perform operations for managing performance of a processing workload via the heterogeneous cores including:

periodically analyzing an operational context for the processing system;

setting core states for at least some of the heterogeneous cores based on the periodic analysis to control activation of the power efficient cores and performance oriented cores for thread scheduling; and scheduling individual threads in dependence upon the core states set based on the periodic analysis to allocate the individual threads between active cores of the heterogeneous cores on a per-thread basis.

17. A computing device as recited in claim 16, wherein the scheduling occurs at a frequency greater than the periodic analysis.

18. A computing device as recited in claim 16, wherein the one or more modules include:

a power manager module configured to perform the periodically analyzing and setting of cores states; and a thread scheduler module configured to perform the scheduling in dependence upon the core states.

19. A computing device as recited in claim 16, wherein periodically analyzing the operational context includes tracking workload, thermal conditions, indications of user presence, and power availability.

20. A computing device as recited in claim 16, wherein scheduling of the individual threads includes, for each particular thread:

using a thread policy assigned to the particular thread to determine core affinities for the particular thread; and placing the particular thread with one of the heterogeneous cores in accordance with the core affinities that are determined.

* * * * *